United States Patent
Masaki et al.

(10) Patent No.: US 7,211,630 B2
(45) Date of Patent: May 1, 2007

(54) RUBBER COMPOSITION AND PNEUMATIC TIRE USING THE SAME IN TREAD

(75) Inventors: Koji Masaki, Kodaira (JP); Yoshikatsu Hatakeyama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 169 days.

(21) Appl. No.: 10/522,381

(22) PCT Filed: Jul. 28, 2003

(86) PCT No.: PCT/JP03/09546

§ 371 (c)(1),
(2), (4) Date: Jan. 26, 2005

(87) PCT Pub. No.: WO2004/011545

PCT Pub. Date: Feb. 5, 2004

(65) Prior Publication Data

US 2005/0277750 A1    Dec. 15, 2005

(30) Foreign Application Priority Data

Jul. 31, 2002    (JP) .............................. 2002-222611

(51) Int. Cl.
*C08L 9/06* (2006.01)
*C08L 15/00* (2006.01)

(52) U.S. Cl. ........................ 525/237; 525/89; 525/241; 525/271; 525/280; 525/331.9; 525/338

(58) Field of Classification Search ................ 525/89, 525/241, 271, 280, 331.9, 338, 237
See application file for complete search history.

(56) References Cited

U.S. PATENT DOCUMENTS

| | | |
|---|---|---|
| 3,225,122 A | 12/1965 | Stumpe, Jr. |
| 4,946,887 A | 8/1990 | Takino et al. |
| 5,221,714 A | 6/1993 | Parker |
| 5,654,253 A | 8/1997 | Hucul et al. |

FOREIGN PATENT DOCUMENTS

| | | |
|---|---|---|
| EP | 0 775 725 A1 | 5/1997 |
| GB | 1 501 378 | 2/1978 |
| JP | 1-215837 A | 8/1989 |
| JP | 11-116715 A | 4/1999 |
| JP | 2000-129037 A | 5/2000 |

*Primary Examiner*—James J. Seidleck
*Assistant Examiner*—Olga Asinovsky
(74) *Attorney, Agent, or Firm*—Sughrue Mion, PLLC

(57) ABSTRACT

A rubber composition comprising as a rubber component a specified styrene-butadiene copolymer (A) and a styrene-isoprene copolymer of a specified hydrogenation ratio (B) wherein a bound styrene content of the copolymer (B) is larger by a given value than a bound styrene content of the copolymer (A) is good in the wear resistance and fracture property and further excellent in the wet-skid resistance and dry gripping property.

9 Claims, No Drawings

RUBBER COMPOSITION AND PNEUMATIC TIRE USING THE SAME IN TREAD

TECHNICAL FIELD

This invention relates to a rubber composition suitable for a tread of a high-performance pneumatic tire, and more particularly to a rubber composition suitable as a tread rubber of a pneumatic tire having good wear resistance and fracture properties and a further improved gripping property.

BACKGROUND ART

Recently, the demand on the high-speed running stability of the vehicle becomes further severer, and hence it is strongly desired to use rubber having excellent wet-skid resistance and dry gripping property in addition to the wear resistance and fracture properties required from the past as a rubber material for a tire tread in the vehicle. However, it is difficult to simultaneously satisfy these properties, and particularly the wear resistance, wet-skid resistance and dry gripping property have a conflicting relation to each other. The gripping property is dependent on the hysteresis loss of the rubber composition. In order to enhance the gripping property of the rubber composition, a greater amount of an aromatic type softening agent has hitherto been compounded, which brings about the lowering of the fracture properties.

In order to solve this problem, the invention disclosed in JP-A-63-101440 proposes the use of low molecular weight SBR. However, a double bond having a crosslinking property is existent though the molecular weight is low, so that there is a problem that a part of the low molecular weight component is crosslinked with rubber matrix and taken into the matrix and hence the sufficient hysteresis loss is not produced. Also, if the double bond part is rendered into a saturated bond by hydrogenation so as not to take the low molecular weight component into the matrix through the crosslinking, the compatibility with the matrix becomes considerably poor, and as a result, there are problems that the fracture properties lower and the low molecular weight component bleeds out.

Furthermore, rubber compositions aiming at the improvement of workability, low fuel consumption, fracture properties and gripping force by a blend of high molecular weight body and a low molecular weight body are disclosed in the inventions of JP-B-59-52664, JP-A-58-147442, JP-A-58-147443, JP-A-60-240746, JP-A-61-203145, JP-A-62-135506, JP-A-64-16845 and the like, but they can not sufficiently satisfy the wet-skid resistance, dry gripping property and wear resistance.

JP-A-2000-129037 discloses a technique solving the above problems. This technique uses a rubber composition using a specified styrene-butadiene copolymer (A') and a styrene-butadiene copolymer having a specified hydrogenation ratio (B') as a rubber component, in which a bound styrene content of the copolymer (B') is made larger by a given value than a bound styrene content of the copolymer (A'), as a rubber material for a tire tread. However, tires having a further improved gripping property are demanded at the present, and the gripping property is insufficient even in the tire using the rubber composition disclosed in the JP-A=2000-129037 in the tread.

DISCLOSURE OF THE INVENTION

It is an object of the invention to provide a novel rubber composition capable of further improving the wet-skid resistance and dry gripping property in addition to good wear resistance and fracture properties for further improving the gripping property in the high-speed running of the vehicle as well as a pneumatic tire using this rubber composition as a tread rubber.

The inventors have found that a hydrogenated styrene-isoprene copolymer having a specific microstructure is high in the tackiness as compared with the conventional hydrogenated styrene-butadiene copolymer and the wear resistance, fracture properties, wet-skid resistance and dry gripping property can be further improved by using the hydrogenated styrene-isoprene copolymer instead of the hydrogenated styrene-butadiene copolymer, and as a result, the invention has been accomplished.

That is, the rubber composition of the invention comprises a rubber component formed by compounding 100 parts by mass of styrene-butadiene copolymer (A) polymerized with a lithium based polymerization initiator, in which a polystyrene-conversion weight average molecular weight through a gel permeation chromatography is $4.0 \times 10^5$–$3.0 \times 10^6$ and a bound styrene content is 10–50 mass % and a vinyl bond content in butadiene portion is 20–70%, with 10–200 parts by mass of a hydrogenated styrene-isoprene copolymer (B), in which a polystyrene-conversion weight average molecular weight through a gel permeation chromatography is $5.0 \times 10^3$–$2.0 \times 10^5$ and a bound styrene content is 25–70 mass % and not less than 60% of double bond in isoprene portion is hydrogenated, and having a relation between the bound styrene content of the polymer (A) and the bound styrene content of the polymer (B) satisfying the following equation:

Bound styrene content of polymer (B)>bound styrene content of polymer (A)+10 (mass %).

In a preferable embodiment of the invention, the polystyrene-conversion weight average molecular weight of the copolymer (A) is $7.0 \times 10^5$–$2.5 \times 10^6$.

In another preferable embodiment of the invention, the bound styrene content of the copolymer (A) is 20–40 mass %.

In the other preferable embodiment of the invention, the vinyl bond content of the butadiene portion in the copolymer (A) is 30–60%.

In a further preferable embodiment of the invention, not less than 80% of double bond in the isoprene portion of the copolymer (B) is hydrogenated.

In a still further preferable embodiment of the invention, the bound styrene content of the copolymer (A) and the bound styrene content of the copolymer (B) satisfy a relation of the following equation:

Bound styrene content of polymer (B)>bound styrene content of polymer (A)+15 (mass %).

In a further preferable embodiment of the invention, the copolymer (B) is compounded in an amount of 20–100 parts by mass based on 100 parts by mass of the copolymer (A).

Also, the pneumatic tire according to the invention is characterized by using the above rubber composition as a tread rubber.

BEST MODE FOR CARRYING OUT THE INVENTION

The invention will be described in detail below. In the rubber composition of the invention, the styrene-butadiene copolymer (A) having specified ranges of polystyrene-conversion weight average molecular weight, bound styrene content and vinyl bond content in butadiene portion and the styrene-isoprene copolymer (B) having specified ranges of polystyrene-conversion weight average molecular weight, bound styrene content and hydrogenation ratio of double bond in isoprene portion are used as a rubber component, in which the bound styrene content of the copolymer (B) is made larger by a given value than the bound styrene content of the copolymer (A). In the invention, by using the styrene-isoprene copolymer (B) instead of the styrene-butadiene copolymer (B') constituting the rubber composition of the aforementioned JP-A-2000-129037 are further improved the wear resistance, fracture properties, wet-skid resistance and dry gripping property in the tire for the vehicle because the styrene-isoprene copolymer (B) is high in the tackiness as compared with the conventional styrene-butadiene copolymer (B').

In the invention, the polystyrene-conversion weight average molecular weight obtained through a gel permeation chromatography (GPC) of the copolymer (A) is defined to be $4.0 \times 10^5 - 3.0 \times 10^6$. When it is less than $4.0 \times 10^5$, the fracture properties lower, while when it exceeds $3.0 \times 10^6$, the viscosity of the polymer solution becomes too high and the productivity lowers. From the same viewpoint, it is preferably $7.0 \times 10^5 - 2.5 \times 10^6$.

Also, the bound styrene content of the copolymer (A) is defined to be 10–50 mass %. When it is less than 10 mass %, the fracture properties lower and it is difficult to simultaneously satisfy the wet-skid resistance and other properties, while when it exceeds 50 mass %, the wear resistance lowers. From the same viewpoint, it is preferably 20–40 mass %. Furthermore, the vinyl bond content in butadiene portion of the copolymer (A) is defined to be 20–70%. When it is less than 20%, the wet-skid resistance is insufficient, while when it exceeds 70%, the wear resistance lowers. From the same viewpoint, it is preferably 30–60%. When the bound styrene content and vinyl bond content in butadiene portion of the copolymer (A) are within the above preferable ranges, the balance between wet-skid resistance and the wear resistance is excellent.

In the invention, the polystyrene-conversion weight average molecular weight obtained through GPC of the copolymer (B) is defined to be $5.0 \times 10^3 - 2.0 \times 10^5$. When it is less than $5.0 \times 10^3$, the fracture properties, wear resistance, wet-skid resistance and dry gripping property are poor, while when it exceeds $2.0 \times 10^5$, the wet-skid resistance and dry gripping property are poor.

Also, the bound styrene content of the copolymer (B) is defined to be 25–70 mass %. When it is less than 25 mass %, the wet-skid resistance and dry gripping property are insufficient, while when it exceeds 70 mass %, the copolymer is resinified to make the composition hard and the wet-skid resistance and dry gripping property lower.

Furthermore, it is defined that not less than 60% of double bond in isoprene portion of the copolymer (B) is hydrogenated. When the hydrogenation ratio is less than 60%, co-crosslinking with the copolymer (A) is caused and hence the sufficient gripping property is not obtained. As the hydrogenation ratio becomes higher, the co-crosslinking property with the copolymer (A) lowers and hence the hysteresis loss becomes high and the excellent gripping property is developed. From this viewpoint, a preferable range of the hydrogenation ratio is not less than 80%.

In addition, the rubber composition of the invention defines that the copolymer (B) is compounded in an amount of 10–200 parts by mass based on 100 parts by mass of the copolymer (A). When the amount is less than 10 parts by mass, the improvement of the wet-skid resistance and dry gripping property is insufficient, while when it exceeds 200 parts by mass, the Mooney viscosity is too low and the productivity becomes poor. From the same viewpoint, it is preferably 20–100 parts by mass.

Moreover, the rubber composition of the invention defines that the bound styrene content of the copolymer (A) and the bound styrene content of the copolymer (B) satisfy the relation of the following equation:

$$\text{Bound styrene content of polymer (B)} > \text{bound styrene content of polymer (A)} + 10 \text{ (mass \%)},$$

which is required to obtain the compatibility between the copolymer (A) and the copolymer (B). When the difference of the bound styrene content is not more than 10 mass %, the compatibility is not obtained and the bleeding of the copolymer (B) toward the rubber surface is caused, and hence when it is used as a tread rubber of the tire, the sufficient adhesion to the other members such as casing rubber and the like is not obtained and also the sufficient strength at break is not obtained. By using the copolymer (B) satisfying the above condition can be obtained the rubber composition satisfying the excellent strength and gripping property. In order to obtain the more complete compatibility, it is preferable that the difference of bound styrene content between the copolymer (A) and the hydrogenated copolymer (B) is not less than 15 mass %.

The copolymer (A) is obtained by copolymerizing butadiene and styrene in a hydrocarbon solvent in the presence of ether or a tertiary amine with a lithium based polymerization initiator.

As the hydrocarbon solvent can be used an alycyclic hydro-carbon such as cyclohexane, methyl cyclopentane, cyclooctane or the like; an aliphatic hydrocarbon such as propane, butane, pentane, hexane, heptane, octane, decane or the like; and an aromatic hydrocarbon such as benzene, toluene, ethylbenzene or the like. These hydrocarbons may be used alone or in a combination of two or more. Among these hydrocarbons, the aliphatic hydroxarbon and alicyclic hydrocarbon are preferable.

As the polymerization initiator is preferable an organo-lithium compound, which includes an alkyllithium such as ethyllithium, propyllithium, n-butyllithium, sec-butyllithium, tert-butyllithium or the like; an aryllithium such as phenyllithium, tolyllithium or the like; an alkenyllithium such as vinyllithium, propenyllithium or the like; an alkylene dilithium such as tetramethylene dilithium, pentamethylene dilithium, hexamethylene dilithium, decamethylene dilithium or the like; an arylene dilithium such as 1,3-dilithiobenzene, 1,4-dilithiobenzene or the like; 1,3,5-trilithiocyclohexane, 1,2,5-trilithionaphthalene, 1,3,5,8-tetralithiodecane, 1,2,3,5-tetralithio-4-hexylanthracene and the like. Among them, n-butyllithium, sec-butyllithium, tert-butyllithium and tetramethylene dilithium are preferable, and n-butyllithium is particularly preferable.

The amount of the organolithium compound used is determined by a polymerization rate in the reaction opera tion and a molecular weight of the resulting polymer, but it is usually about 0.02–5 mg, preferably 0.05–2 mg as a lithium atom per 100 g of a monomer.

The polymerization reaction for obtaining the copolymer (A) may be carried out by any one of a batch polymerization system and a continuous polymerization system. The polymerization temperature in the above polymerization reaction is preferable to be within a range of 0–130° C. Also, the polymerization reaction may be conducted by any polymerization types such as isothermal polymerization, temperature rise polymerization and adiabatic polymerization. Further, an allene compound such as 1,2-butadiene or the like may be added for preventing the formation of gel in a reaction vessel during the polymerization.

On the other hand, the hydrogenated styrene-isoprene copolymer (B) can be obtained by hydrogenating a polymer synthesized in the same manner as in the copolymer (A) except that isoprene is used instead of butadiene through the usual hydrogenation method. That is, the hydrogenation is carried out under a pressurized hydrogen of 1–100 atmospheric pressure by using a catalyst selected from a hydrogenation catalyst such as an organic carboxylic acid nickel, an organic carboxylic acid cobalt and organometallic compounds of Group I-III; a catalyst of nickel, platinum, palladium, ruthenium or rhodium metal carried on carbon, silica, diatomaceous earth or the like; a complex of cobalt, nickel, rhodium or ruthenium; and so on.

In the invention, the polymerization solution of the copolymer (B) is added to the polymerization solution of the copolymer (A) to obtain a polymerization reaction solution containing styrene-butadiene copolymer and styrene-isoprene copolymer, and rubber component and the solvent are isolated from this solution by a method used in the usual solution polymerization method (for example, a method wherein a stabilizing agent or the like is added at a solution state and then directly dried or subjected to steam stripping) and washed and dried to obtain the rubber composition according to the invention.

The rubber component in the rubber composition of the invention comprises only the copolymer (A) and the copolymer (B), or may be blended with the other diene rubber(s) such as natural rubber, polyisoprene rubber, emulsion polymerized styrene-butadiene rubber, polybutadiene rubber or the like. Such a rubber component is added with a reinforcing agent such as carbon black, silica or the like, and various additives and milled in a roll, a Banbury mixer, a kneader or the like and then added with sulfur, a vulcanization accelerator and the like, which can be vulcanized to use as a tread rubber for the tire. The case that the rubber composition of the invention is blended with the emulsion polymerized styrene-butadiene rubber is particularly preferable for use in a tire taking account of high-speed running, and the case of blending with polybutadiene is particularly preferable for use in a tire taking account of low-temperature characteristics.

The following examples are given in illustration of the invention and are not intended as limitations thereof. In these examples, various properties are evaluated by the following methods.

EXAMPLES (1) The molecular weight ($M_w$) and molecular weight distribution ($M_w/M_n$) are measured under the following conditions by using 244 model GPC made by Waters Corp. and a differential refractometer as a detector.

column: GMH-3, GMH-6, G6000H-6 columns made by Toyo Soda Co., Ltd.

mobile phase: tetrahydrofuran (2) Polystyrene-converted weight average molecular weight The polystyrene-converted molecular weight of the polymer is measured by using a calibration curve which is previously prepared by using a monodisperse styrene polymer made by Waters Corp. and determining a relation between molecular weight of peak of the monodisperse styrene polymer through GPC and count number of GPC.

(3) Vulcanization properties

① The strength at break is measured according to JIS K6301.

② The wet-skid resistance and dry-skid resistance are evaluated through a skid tester by duplicating wet road surface and dry road surface.

③ The wear resistance is evaluated by a Lambourn abrasion tester.

Synthesis of Copolymer (A-1):

In an autoclave of 5 liters sufficiently purged with nitrogen and provided with a stirring blade are charged 3000 g of cyclohexane, 12 g of tetrahydrofuran (THF), 200 g of 1,3-butadiene and 100 g of styrene, and a temperature inside the autoclave is adjusted to 21° C. Then, 0.10 g of n-butyl-lithium is added to conduct polymerization under a temperature rising condition for 60 minutes, and the conversion of the monomer is confirmed to be 99%. Thereafter, 3.5 g of 2,6-do-t-butyl-p-cresol is added as an antioxidant. The analytical values are shown in Table 1.

Synthesis of Copolymers (A-2)-(A-6):

The synthesis is conducted in the same manner as mentioned above except that the charging ratio of monomers and the amount of the catalyst are changed. The analytical results are shown in Table 1.

TABLE 1

| Copolymer (A) | A-1 | A-2 | A-3 | A-4 | A-5 | A-6 |
|---|---|---|---|---|---|---|
| Bound styrene content (mass %) | 33 | 8 | 33 | 20 | 33 | 41 |
| Vinyl bond content (%) | 40 | 40 | 40 | 60 | 80 | 35 |
| Weight average molecular weight | $7.0 \times 10^5$ | $7.0 \times 10^5$ | $3.1 \times 10^5$ | $1.05 \times 10^6$ | $7.1 \times 10^5$ | $6.5 \times 10^5$ |

Synthesis of Copolymer (B-1):

In an autoclave of 5 liters sufficiently purged with nitrogen and provided with a stirring blade are charged 3000 g of cyclohexane, 12 g of tetrahydrofuran (THF), 150 g of 1,3-butadiene and 150 g of styrene, and a temperature inside the autoclave is adjusted to 21° C. Then, 1.50 g of n-butyl-lithium is added to conduct polymerization under a temperature rising condition for 60 minutes, and the conversion of the monomer is confirmed to be 99%. Thereafter, 4.68 g of tributylsilyl chloride is added to stop the polymerization, and a catalyst solution of nickel naphthenate:triethylaluminum:butadiene=1:3:3 (mol ratio) previously prepared in another vessel is charged so as to become 1 mol of nickel per 1000 mols of butadiene portion in the copolymer. Thereafter, hydrogen is introduced into the reaction system under a hydrogen pressure of 30 atm to conduct the reaction at 80° C. The hydrogenation ratio is calculated from a reduction of an unsaturated bond portion in a spectrum of 100 MHz proton NMR measured at a concentration of 15 mass % using carbon tetrachloride as a solvent. The analytical values are shown in Table 2.

Synthesis of Copolymer (B-2):

The synthesis is conducted in the same manner as in the copolymer B-1 except that isoprene is used instead of 1,3-butadiene. The analytical values are shown in Table 2.

Synthesis of Copolymers (B-3)-(B-7):

The synthesis is conducted in the same manner as in the copolymer B-2 except that the charging ratio of monomers, amount of catalyst and hydrogen pressure are changed. The analytical values are shown in Table 2.

TABLE 2

| Copolymer (B) | B-1 | B-2 | B-3 | B-4 | B-5 | B-6 | B-7 |
|---|---|---|---|---|---|---|---|
| Kind of copolymer | SBR | SIR | SIR | SIR | SIR | SIR | SIR |
| Bound styrene content (mass %) | 50 | 50 | 48 | 50 | 22 | 50 | 45 |
| Weight average molecular weight | $1.6 \times 10^4$ | $1.6 \times 10^4$ | $1.6 \times 10^4$ | $4.0 \times 10^3$ | $1.5 \times 10^4$ | $1.6 \times 10^4$ | $1.5 \times 10^5$ |
| Hydrogenation ratio (%) | 85 | 85 | 55 | 70 | 83 | 65 | 90 |

A rubber composition is prepared by mixing various components are mixed in a Banbury mixer according to a compounding recipe shown in Table 3, and vulcanization properties thereof are shown in Table 4.

TABLE 3

|  | parts by mass |
|---|---|
| Copolymer (A) | 100 |
| Copolymer (B) | variable |
| Carbon black (ISAF) | 100 |
| Aromatic oil | 20 |
| Stearic acid | 2 |
| Zinc white | 3 |
| Antioxidant *1 | 1 |
| Vulcanization accelerator *2 | 0.4 |
| Vulcanization accelerator *3 | 1 |
| Sulfur | 1.5 |

*1 N-1,3-dimethyl-butyl-N'-phenyl-p-phenylenediamine
*2 1,3-diphenyl guanidine
*3 dibenzothiazyl disulfide

TABLE 4

|  | Conventional Example | Example 1 | Comparative Example 1 | Comparative Example 2 | Comparative Example 3 | Example 2 | Example 3 |
|---|---|---|---|---|---|---|---|
| Copolymer (A) (parts by mass) | A-1 (100) | A-1 (100) | A-1 (100) | A-1 (100) | A-1 (100) | A-1 (100) | A-1 (100) |
| Copolymer (B) (parts by mass) | B-1 (80) | B-2 (80) | B-3 (80) | B-4 (80) | B-5 (80) | B-6 (80) | B-7 (80) |

TABLE 4-continued

| | | | | | | | |
|---|---|---|---|---|---|---|---|
| Strength at break (index) | 100 | 105 | 104 | 99 | 103 | 104 | 105 |
| Wet-skid resistance (index) | 100 | 110 | 101 | 104 | 100 | 106 | 105 |
| Dry gripping property (index) | 100 | 110 | 100 | 102 | 99 | 105 | 107 |
| Wear resistance (index) | 100 | 105 | 103 | 100 | 104 | 104 | 104 |

| | Comparative Example 4 | Comparative Example 5 | Example 4 | Comparative Example 6 | Comparative Example 7 |
|---|---|---|---|---|---|
| Copolymer (A) (parts by mass) | A-2 (100) | A-3 (100) | A-4 (100) | A-5 (100) | A-6 (100) |
| Copolymer (B) (parts by mass) | B-2 (80) | B-2 (80) | B-2 (80) | B-2 (80) | B-2 (80) |
| Strength at break (index) | 97 | 95 | 103 | 99 | 99 |
| Wet-skid resistance (index) | 105 | 109 | 109 | 110 | 108 |
| Dry gripping property (index) | 104 | 111 | 110 | 111 | 110 |
| Wear resistance (index) | 99 | 94 | 102 | 98 | 96 |

| | Comparative Example 8 | Example 5 | Example 6 | Example 7 | Example 8 |
|---|---|---|---|---|---|
| Copolymer (A) (parts by mass) | A-1 (100) | A-1 (100) | A-1 (100) | A-1 (100) | A-1 (100) |
| Copolymer (B) (parts by mass) | B-2 (5) | B-2 (20) | B-2 (50) | B-2 (100) | B-2 (130) |
| Strength at break (index) | 105 | 106 | 106 | 105 | 104 |
| Wet-skid resistance (index) | 95 | 101 | 106 | 111 | 113 |
| Dry gripping property (index) | 97 | 102 | 108 | 112 | 112 |
| Wear resistance (index) | 107 | 106 | 105 | 103 | 102 |

The property is separated by an index on the basis that Comparative Example 1 is 100, in which the larger the index value, the better the property.

As seen from the results of Table 4, the vulcanizate of each example is excellent in the wear resistance, fracture property, wet-skid resistance and dry gripping property as compared with the vulcanizate of the conventional example using the hydrogenated styrene-butadiene copolymer.

Also, the vulcanizate of each example is excellent in the balance among the wear resistance, fracture property, wet-skid resistance and dry gripping property as compared with the vulcanizates of Comparative Examples 1–8 in which one or more of weight average molecular weight, bound styrene content and vinyl bond content in copolymer (A), weight average molecular weight, bound styrene content and hydrogenation ratio in copolymer (B), a relation between bound styrene content of copolymer (B) and bound styrene content of copolymer (A), and compounding amounts of copolymer (A) and copolymer (B) are outside the range defined in the invention.

INDUSTRIAL APPLICABILITY

According to the invention, rubber compositions having good wear resistance and fracture property and capable of further improving wet-skid resistance and dry gripping property are obtained by using the specified styrene-butadiene copolymer (A) and the specified hydrogenated low-molecular weight styrene-isoprene copolymer (B) as a rubber component and making the bound styrene content of the copolymer (B) larger by a given value than the bound styrene content of the copolymer (A). Such rubber compositions are suitable as a rubber for a tire tread.

The invention claimed is:

1. A rubber composition comprising a rubber component formed by compounding a styrene-butadiene copolymer (A) polymerized with a lithium based polymerization initiator, in which a polystyrene-conversion weight average molecular weight through a gel permeation chromatography is $4.0 \times 10^5 - 3.0 \times 10^6$ and a bound styrene content is 10–50 mass % and a vinyl bond content in butadiene portion is 20–70%, with 10–200 parts by mass of a hydrogenated styrene-isoprene copolymer (B) based on 100 parts by mass of the copolymer (A), in which a polystyrene-conversion weight average molecular weight through a gel permeation chromatography is $5.0 \times 10^3 - 2.0 \times 10^5$ and a bound styrene content is 25–70 mass % and not less than 60% of double bond in isoprene portion is hydrogenated, and having a relation between the bound styrene content of the polymer (A) and the bound styrene content of the polymer (B) satisfying the following equation:

Bound styrene content of polymer (B)>bound styrene content of polymer (A)+10 (mass %).

2. A rubber composition according to claim 1, wherein the polystyrene-conversion weight average molecular weight of the copolymer (A) is $7.0 \times 10^5 - 2.5 \times 10^6$.

3. A rubber composition according to claim 1, wherein the bound styrene content of the copolymer (A) is 20–40 mass %.

4. A rubber composition according to claim 1, wherein the vinyl bond content of the butadiene portion in the copolymer (A) is 30–60%.

5. A rubber composition according to claim 1, wherein not less than 80% of double bond in the isoprene portion of the copolymer (B) is hydrogenated.

6. A rubber composition according to claim 1, wherein the bound styrene content of the copolymer (A) and the bound styrene content of the copolymer (B) satisfy a relation of the following equation:

Bound styrene content of polymer (B)>bound styrene content of polymer (A)+15 (mass %).

7. A rubber composition according to claim 1, wherein the copolymer (B) is compounded in an amount of 20–100 parts by mass based on 100 parts by mass of the copolymer (A).

8. A pneumatic tire characterized by using a rubber composition as claimed in claim 1 as a tread rubber.

9. A rubber composition according to claim 2, wherein the bound styrene content of the copolymer (A) is 20–40 mass %.

* * * * *